United States Patent

[11] 3,558,888

| [72] | Inventor | Arthur H. Youmans<br>Houston, Tex. |
|---|---|---|
| [21] | Appl. No. | 638,145 |
| [22] | Filed | May 12, 1967 |
| [45] | Patented | Jan. 26, 1971 |
| [73] | Assignee | Dresser Industries, Inc.<br>Dallas, Tex.<br>a corporation of Delaware |

[54] NEUTRON WELL LOGGING METHOD AND APPARATUS
23 Claims, 5 Drawing Figs.

[52] U.S. Cl. .................................................. 250/83.1,
250/71.5, 250/83.6
[51] Int. Cl. .................................................. G01t 3/00
[50] Field of Search ............................................ 250/83.6W,
106IL, 71.5, 83.1

[56] References Cited
UNITED STATES PATENTS

| 2,480,674 | 8/1949 | Russell | 250/83.6X |
| 3,032,653 | 5/1962 | White | 250/106X |
| 3,102,956 | 9/1963 | Armistead | 250/83.6X |
| 3,420,998 | 1/1969 | Mills, Jr. | 250/83.6X |

*Primary Examiner*—Ralph G. Nilson
*Assistant Examiner*—Davis L. Willis
*Attorneys*—Robert W. Mayer, Daniel Rubin, Peter J. Murphy, Douglas M. Clarkson, Roy L. Van Winkle and William E. Johnson, Jr.

ABSTRACT: Radioactivity method and apparatus for measuring the oil in invaded zone of an earth formation, wherein the thermal neutron capture cross section of the mud filtrate is altered to correspond to that of the formation water, and wherein the amount of oil remaining the invaded zone is measured as a function of the macroscopic thermal neutron capture cross section of the formation.

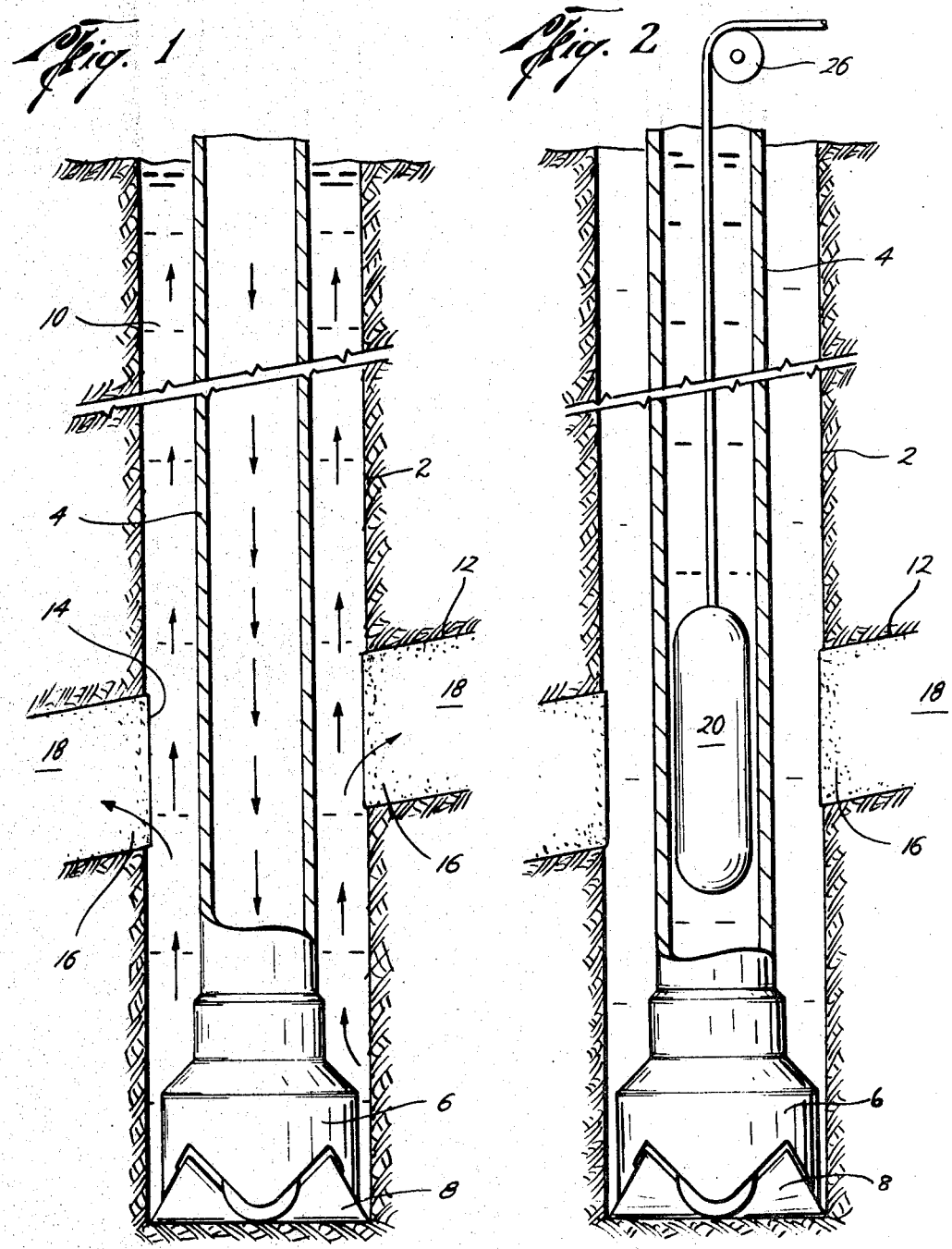

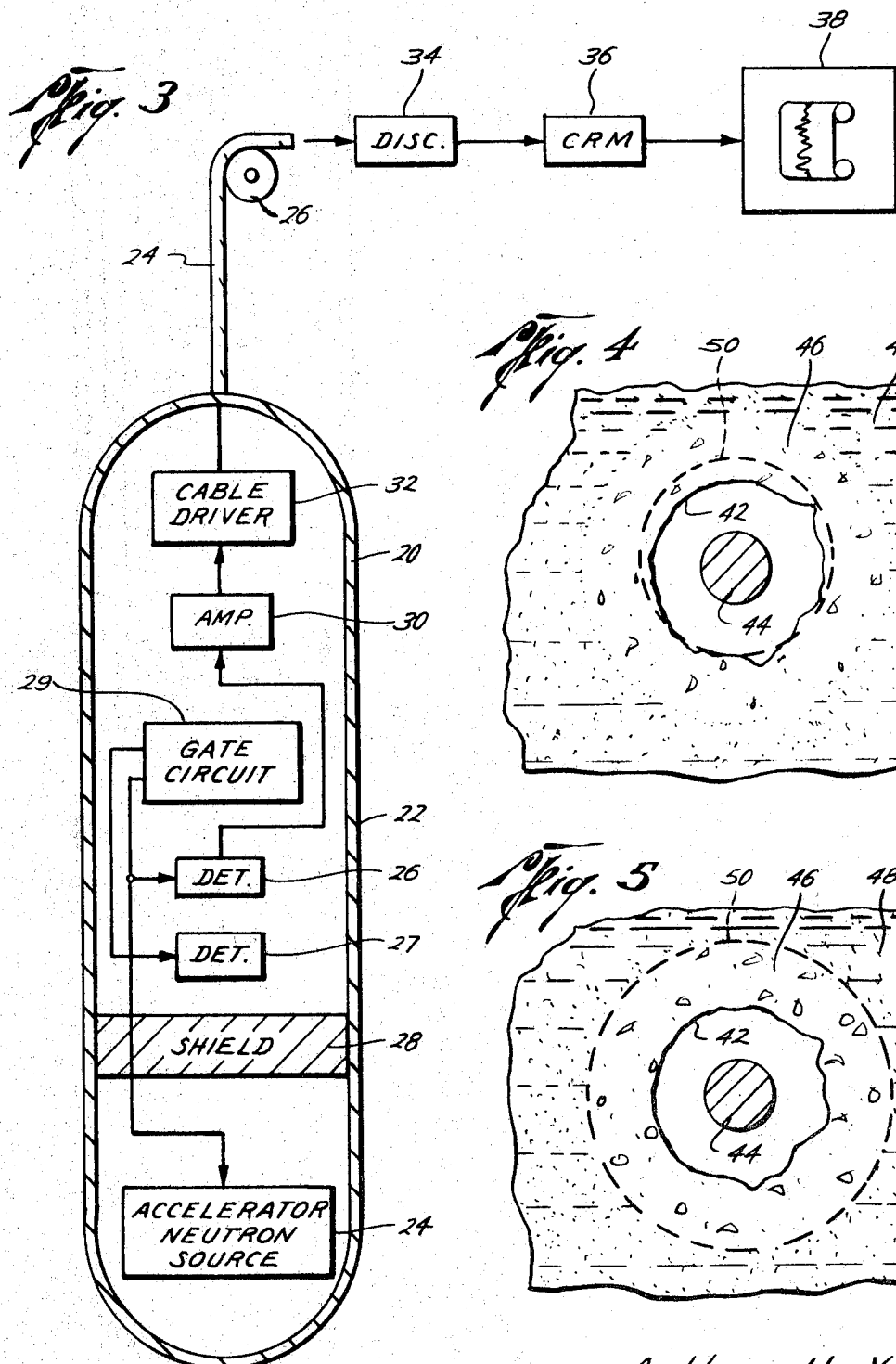

NEUTRON WELL LOGGING METHOD AND APPARATUS

BACKGROUND OF THE INVENTION

This invention relates to method and apparatus for performing radiological surveys of subsurface earth formations traversed by a borehole, and more particularly relates to improved neutron methods and apparatus for investigating the character of the fluid contents of an earth formation which is invaded by drilling mud filtrate.

It is well known that oil and gas is contained in subsurface earth formations, and that boreholes are drilled into these formations for the purpose of recovering these fluids. It is also well known that a liquid which is commonly known as "drilling mud" is pumped down the borehole and over the drill bit, during the drilling operation, for the purpose of carrying the drill cuttings to the surface and to lubricate the drill bit.

It should be clearly understood that the fluids in a subsurface formation do not ordinarily gush to the surface the instant the drill bit enters the formation. Instead, it is usual that the formation will be completely drilled through without there being any indication that oil or gas has been encountered. Accordingly, it is usual practice to log a borehole to investigate the character of each earth formation along its entire length.

In the copending patent application filed Jun. 10, 1954 by Arthur H. Youmans, and bearing Ser. No. 435,698, (now U.S. Pat. No. 3,379,884) there is disclosed a technique for measuring a function of the thermal neutron capture cross section of the subsurface earth formations to determine the character and quantity of any fluids contained therein. More particularly, a logging instrument containing a pulsating source of fast or high energy neutrons and either a gamma ray or a thermal neutron detector is passed through the borehole at the end of a logging cable. Each pulsation of the neutron source produces a discrete burst of fast neutrons in the borehole to establish a so-called fast neutron "population" in the irradiated portion of the borehole and surrounding earth substances.

Each fast neutron population rapidly declines away, as the fast neutrons are either absorbed or slowed down to thermal energy, and thus is replaced by a corresponding thermal neutron population. Thereafter, each such thermal neutron population declines at a rate which is functionally related to the macroscopic thermal neutron capture cross section of the substances permeated by the thermal neutrons.

It will be apparent that if the thermal neutrons (or the gamma rays arising from the neutron capture reactions) are detected and counted during two discrete equal time intervals following each fast neutron burst, the relative magnitude of the two counting rates will be directly indicative of the rate of decline of the thermal neutron population in the permeated substances. Since the rate of decline of the thermal neutron population is a direct function of the macroscopic thermal neutron capture cross section of the irradiated substances, it will be readily apparent that the measurement thus obtained is directly related to the macroscopic thermal neutron capture cross section of the substances sought to be investigated.

Although it is preferred that these two discrete detection intervals be equal in duration, for the sake of simplicity in practicing the present invention, it will be apparent that this is not essential. However, if the detection intervals are unequal in duration, then it will also be apparent that the inequality must be known and compensated for in deriving the measurement sought to be made.

It will be apparent that it is the earth substances surrounding the borehole which are of interest, rather than the contents of the borehole. Since the fast neutron pulses must be generated in the borehole, the measurement obtained by means of the foregoing technique may be influenced by the rate of the decline of the thermal neutrons in the borehole as well as in the surrounding earth substances. It is usual that the thermal neutron capture cross section of the contents of the borehole is substantially greater than that of formations likely to contain oil or gas. This makes it possible to reduce substantially the effect of the borehole substances by employing a detector primarily sensitive to gamma rays rather than thermal neutrons, and by commencing the first of the two detection intervals only after substantially all of the thermal neutrons in the borehole have all been captured.

Although this technique is extremely useful and has obtained substantial commercial acceptance throughout the industry, there are occasions when it is desirable to measure the thermal neutron capture cross section of the formation by detecting the thermal neutrons specifically, rather than by detecting the gamma rays arising from capture reactions of the thermal neutrons with the capturing nuclei.

It should of course be recognized that the size of the borehole is a factor in the lifetime of the thermal neutrons in the borehole. Moreover, the cross-sectional area and shape of the borehole will vary substantially along the length of the borehole. The delay interval between the occurrence of the fast neutron pulse and the commencement of the first detection interval is ordinarily preselected before the logging instrument is lowered into the borehole to produce a satisfactory measurement under conditions where an average borehole cross-sectional area is encountered. Thus, it will be apparent that, wherever the borehole cross-sectional area greatly exceeds this assumed average, the detector may see and count rays emanating from capturing nuclei in the borehole. On the other hand, wherever the borehole cross-sectional area is substantially smaller, the aforementioned time delay interval may be greater than necessary.

Another important consideration is the fact that the drilling mud pumped down through the drill pipe and up through the annulus of the borehole tends to invade porous zones of the earth to a varying extent, and to push the natural fluids therein back away from the borehole. Thus, even when the first detection interval is delayed so as to exclude capture gamma radiation originating in the borehole, the gamma rays which are accepted and counted may emanate from capturing nuclei in the filtrate of invading drilling mud rather than from nuclei of the natural formation fluids. Inasmuch as it is difficult to predetermine the lateral depth of any invaded zone, it will be apparent that it is a problem which is difficult to solve to determine the thermal neutron capture cross section the zone would have had if it had not been invaded.

These disadvantages of the prior art are overcome with the present invention, and novel methods and apparatus are provided herein for making a quantitative measurement of the oil in a subsurface earth formation even when it is invaded by drilling mud filtrate. As will hereinafter be explained, it is the ultimate objective of the present invention to determine the amount of oil in a formation by measuring the total water and oil therein, determining the percent of the formation water in such total, and by then subtracting the percentage of the water from 100 percent to determine the percent of the oil to the total. Having determined the amount of total water and oil by means of the present invention, it is a simple matter to compute the actual quantity of the oil in the formation.

As hereinbefore stated, however, the total fluid in the invaded portion of the formation will include a percentage of drilling mud filtrate as well as oil and natural formation water, and thus the foregoing technique cannot be used to compute the amount of oil in the formation unless the percent of mud filtrate has also been determined. In the preferred form of the present invention, this computation may be avoided by altering the characteristics of the drilling mud so that the mud filtrate will have the same thermal neutron capture cross section as the formation water. Accordingly, the percent of the formation water and mud filtrate can be computed as a single factor, and then subtracted from 100 percent to obtain the percent of oil in the formation.

It should be apparent that the amount of oil remaining in the invaded portion of a formation will necessarily be less than the amount of oil in the uninvaded region. Nevertheless, any formation having oil remaining in the invaded zone to any significant extent is a formation worthy of serious consideration and further investigation, since the invading filtrate usually displaces a substantial portion (if not most) of the natural formation fluids.

Accordingly, it is an object of the present invention to provide novel methods and apparatus for investigating the character of subsurface earth formations traversed by a borehole.

It is also an object of the present invention to provide novel methods and apparatus for distinguishing between oil and water-bearing formations which have been invaded by drilling mud filtrates.

It is a further object of the present invention to provide novel methods and apparatus for measuring the amount of oil present in a subsurface earth formation.

It is another object of the present invention to provide novel methods and apparatus for measuring the amount of oil in an invaded subsurface earth formation.

It is a specific object of the present invention to provide a novel method of radioactivity well logging comprising injecting into a subsurface earth formation a fluid having a preselected thermal neutron capture cross section, thereafter irradiating said fluid and said formation with a discrete burst of fast neutrons, detecting during at least two discrete successive time intervals radiations occasioned in said formation by said fast neutrons, and deriving a function of the ratio of said radiations detected during one of said intervals to the radiations detected during the other of said intervals.

It is another specific object of the present invention to provide a method of determining the amount of oil in a predetermined volumetric unit of a subsurface earth formation containing a liquid and traversed by a borehole, said method comprising deriving the porosity of said earth formation, deriving the thermal neutron capture cross sections of oil, of the matrix of said formation, and of the water in said formation, deriving the macroscopic thermal neutron capture cross section of said formation, and deriving an indication of the volume of oil in said volumetric unit of said formation according to the relationship:

$$S_o = \frac{\Sigma_{formation} - (1-\phi)\Sigma_{matrix} - S_w \phi \Sigma_{water}}{\phi \Sigma_{oil}}$$

wherein $\Sigma_{formation}$ is the macroscopic thermal neutron capture cross section of said formation, $\Sigma_{matrix}$ is the thermal neutron capture cross section of said matrix, $\Sigma_{water}$ is the thermal neutron capture cross section of said water, $\Sigma_{oil}$ is the thermal neutron capture cross section of oil, $\Phi$ is the porosity of said formation, $S_w$ is the fractional portion of the total liquid in said unit of said formation which is water, wherein $S_o$ is the fractional portion of the total liquid in said unit of said formation which is oil, and wherein $S_o$ plus $S_w$ is equal to unity.

It is a further specific object of the present invention to provide a method of making a quantitative determination of the movable oil in a subsurface earth formation, said method comprising the steps of injecting into a portion of said formation so as to at least partially displace the natural fluids therein a preselected fluid having a thermal neutron capture cross section substantially the same as that of any formation water in said formation, making a first measurement of the amount of oil remaining in said portion of said formation invaded by said preselected fluid, permitting the natural fluids in said formation to return to said portion invaded by said preselected fluid, making a second measurement of the amount of oil in said portion of said formation after said natural fluids are permitted to return to said portion, and comparing said first and second measurements.

These and other objects and features of the present invention will be apparent from the following detailed description, wherein reference is made to the figures in the accompanying drawings.

DRAWINGS

FIG. 1 is a pictorial representation, partly in cross section, wherein is depicted a typical borehole containing a string of drill pipe with drill bit, and showing the flow of drilling mud in and out of the borehole and into a porous formation traversed by the borehole.

FIG. 2 is a pictorial representation, partly in cross section, of the borehole depicted in FIG. 1 wherein the drill string and bit has been removed, and wherein wire-line logging apparatus employing circuitry suitable to the present invention has been run into the borehole for logging the adjacent earth materials.

FIG. 3 is a schematic and functional representation of the details of apparatus suitable for logging the formations.

FIG. 4 is a functional representation of the borehole and instrument depicted in FIG. 2, including a representation of the zone of investigation of such instrument in the surrounding earth.

FIG. 5 is a functional representation of the borehole and instrument depicted in FIG. 4 wherein the instrument has been adjusted to exclude the invaded zone from the zone of investigation of the instrument.

DETAILED DESCRIPTION OF INVENTION

In its basic concept, the present invention utilizes well logging apparatus having a source of "fast" or high energy neutrons, and a radiation detector which senses radiations passing into the borehole from the surrounding earth. Both the neutron source and the radiation detector must be selectably actuable; i.e., the source must be capable of being operated intermittently to produce neutrons in pulses or discrete bursts of preselected duration and frequency, and the detector must be capable of being "turned" on and off for preselected time intervals.

Each time the neutron source is pulsed, it effectively creates a cloud or "population" of fast neutrons which permeate not only the section of the borehole surrounding the neutron source but also the earth substances immediately adjacent thereto. Each of these fast neutrons may undergo one or more nuclear reactions, before slowing down to thermal energy, and before being captured. In fact, some may be absorbed before declining to thermal energy. However, most of the fast neutrons will decline to thermal energy within a very short time (20—30 microseconds). Thus, the disappearance of the "fast" neutron population created by each pulsation of the neutron source in effect creates a "thermal" neutron population in the same localized region in the borehole and adjacent earth.

As hereinbefore stated, it is a feature of the present invention to obtain a measurement indicative of the macroscopic thermal neutron capture cross section of an earth formation of interest, and this is accomplished by measuring a related function of a thermal neutron population in the formation. In other words, the thermal neutron population declines away as the thermal neutrons are captured, one-by-one, by the nuclei with which they collide. However, the likelihood that a bombarded nucleus will capture a thermal neutron depends upon the thermal neutron capture cross section of that nucleus, and therefore the rate of decline of the thermal neutron population depends upon the rate at which the aggregate of all of these nuclei capture the thermal neutrons which compose the thermal neutron population.

For example, if the agglomerate material is composed substantially of elements having relatively low thermal neutron capture cross sections, such as calcium or silicon, then the thermal neutron population will decline relatively slowly. On the other hand, if the agglomerate material includes a relatively high percentage of one or more elements having relatively higher thermal neutron capture cross sections (such as hydrogen or chlorine), then the thermal neutron population will disappear relatively quickly.

It will thus be apparent that the rate of decline of a thermal neutron population is a direct function of the macroscopic thermal neutron capture cross section of the irradiated material. As previously stated, this may be accomplished by detecting and counting either thermal neutrons or gamma rays during two preselected equal time intervals following each pulsation of the neutron source. Thereafter, the macroscopic thermal neutron capture cross section of the formations of interest may be determined by means of the following relationship:

$$\Sigma_{formation} = k \log \frac{N_2}{N_1} \quad (1)$$

where $N_1$ is the number of radiations detected during the first detection interval following the generation of the fast neutron pulse, $N_2$ is the number of radiations detected during the second later interval, and $k$ is a preselected constant.

However, it should be remembered that the irradiated formation includes both the rock matrix and any fluids which may be contained therein. Hence, the macroscopic thermal neutron capture cross section of a liquid-filled formation which is irradiated as hereinbefore described, may accordingly be expressed as follows:

$$\Sigma_{formation} = A\Sigma_{matrix} + B\Sigma_{fluid} \quad (2)$$

where A, and B represent the relative proportions of matrix and the fluids (oil and formation water), and where the sum of A and B is unity. Therefore, equation (2) may be restated as follows:

$$\Sigma_{formation} = A\Sigma_{matrix} + B\Sigma_{oil} + C\Sigma_{water} \quad (3)$$

or as follows:

$$\Sigma_{formation} = (I - \phi) \Sigma_{matrix} + S_o\phi\Sigma_{oil} + S_w\phi\Sigma_{water} \quad (4)$$

where $\Phi$ represents the porosity of the formation, and where $S_w$ plus $S_o$ equals unity and represents the fractional portions of fluid in a unit of the formation. However, equation (4) is preferably stated as follows:

$$\Sigma_{formation} = (1-\Phi) \Sigma_{matrix} + S_w\Phi\Sigma_{water} + (1-S_w)\Phi\Sigma_{oil} \quad (5)$$

The porosity of the formation must be predetermined by conventional measurements, and the macroscopic thermal neutron capture cross section of oil is, of course, a known constant. The macroscopic thermal neutron capture cross sections of the rock matrix and formation water, must be known or be derived by either chemical analysis of samples, or by the technique described in the copending patent application Ser. No. 423,037, filed Jan. 4, 1965, by A. H. Youmans (now U.S. Pat. No. 3,426,203 ). Thus, when $\Sigma$ formation is measured by means of the present invention, $S_w$ is the only unknown quantity (provided the formation has not been invaded) and may be easily determined. When $S_w$ is determined, then the value of $S_o$ follows automatically.

As hereinbefore stated, when logging in uncased boreholes those formations which are of interest are often invaded by the filtrate of the drilling mud, and thus equation (2) should be more truthfully represented, insofar as the invaded zone is concerned, by the following relationship:

$$\Sigma_{formation} = A\Sigma_{matrix} + B\Sigma_{oil} + C\Sigma_{water} + D\Sigma_{filtrate} \quad (6)$$

and equation (4) accordingly must be restated as:

$$\Sigma_{formation} = (1 - \Phi) \Sigma_{matrix} + S_w\Phi\Sigma_{water} + IS_w\Phi\Sigma_{water} + S_f\Phi\Sigma_{filtrate} \quad (7)$$

where $S_f$ represents the fractional portion of the filtrate in a unit of fluid in the invaded zone of the formation, and where the sum of $S_o$, $S_w$, and $S_f$ is unity. Thus, it will be clearly apparent that computation of $S_o$ in the invaded zone of the formation is a complex as well as impractical task insofar as commercial well logging requirements are concerned.

Referring now to FIG. 1, there may be seen a pictorial representation of a typical borehole 2 containing a string of conventional drill pipe 4 with a rotary drill bit 6 mounted at the lower end thereof. As is well known, it is common practice during rotary drilling operations to pump a continuous flow of drilling mud down through the drill pipe string 4 to the bottom of the borehole 2. The drilling mud stream exits from the drill bit 6 through ports therein and flows out over the teeth of the cutting wheels 8 to function as a coolant and a lubricant for the drill bit 6. From the bottom of the borehole 2, the drilling mud flows up the borehole 2 through the annulus 10 to the surface to carry away the rock chips and other cuttings from the drill bit 6.

Drilling mud derives its name from the fact that when the first oil and gas wells were drilled, plain water was injected into the borehole to perform the aforementioned functions, and when this water was mixed with the drill cuttings in the borehole it tended to form a mud slurry. Modern drilling mud is a specially prepared mix, however, and is composed of either a water or oil-base liquid having suspended therein a combination of undissolved particles of preselected materials such as one or more oxides or salts of barium.

Referring again to FIG. 1, there may be seen a porous (and thus a potentially fluid-bearing) earth formation 12 which has been traversed by the borehole 2 and drill bit 6, and which may be presumed to contain oil and either fresh or salt water to an unknown extent. Although these formation fluids may be trapped in the formation 12 under a pressure, they do not escape into the borehole 2 because the pressure in the borehole 2 can be made to exceed the pressure in the formation 12. Accordingly, the drilling mud is driven against the face of the porous formation 12 which acts as a filter, the solid undissolved particles in the drilling mud will tend to be filtered out to form a "mud cake" on the face of the formation 12, and hydraulic pressure in the borehole and the whipstocking action of the revolving drill string 4 against the wall of the borehole 2 will combine to form this mud cake 14 into an effective seal insofar as the natural fluids in the formation 12 are concerned. However, before a sufficient amount of the solid matter in the drilling mud has filtered out on the face of the formation 12, and before the mud cake 14 has been compressed into a seal on the face of the formation, a substantial volume of the liquid portion of the drilling mud will enter the formation 12 as a filtrate.

As is also represented in FIG. 1, the filtrate of the drilling mud will invade the formation 12 in a limited region adjacent the borehole 2, and will tend to displace a substantial portion of the natural formation fluids in this limited region. Thus, the region of such displacement is commonly known as the "invaded zone" 16, and the remainder of the lateral depth of the formation 12 into which these natural fluids are displaced or driven is commonly referred to as the "uninvaded zone" 18. Hence, it will be apparent that it is the uninvaded zone 18 which is of primary interest, but it is the annulus 10 and the invaded zone 16 which is adjacent the logging instrument 20, as may be seen in FIG. 2.

Referring now to FIG. 3, there may be seen a more detailed representation of the logging instrument 20 which is depicted generally in FIG. 2, and which is suitable for purposes of the present invention. In particular, there may be seen an elongated housing 22 which may be suspended from one end of a conventional logging cable 24 for the purpose of being pulled through the borehole 2 to progressively survey the adjacent earth formations. The cable 24 may be supported in any convenient manner such as by a sheave wheel 26, which rotates to provide an indication of borehole depth as the cable 24 is either payed into or drawn out of the borehole 2. The sheave wheel 26 may be supported in any convenient manner, such as by a conventional derrick (not depicted) erected over the mouth of the borehole 2.

In the housing 22 there may be disposed a source 24 of high energy neutrons and a suitable radiation detector 26. A radiation shield 28 is preferably interposed between the source 24 and the detector 26 to prevent direct irradiation of the detector 26 by the neutrons from the source 24.

The neutron source 24 may be any apparatus suitable for producing discrete pulses or bursts of fast neutrons at a preselected rate. However, it has been found especially desirable to pulse the source at a rate of about 1,000 pulses or bursts per second, and to limit each neutron pulsation to about 10 —20 microseconds duration. The well known "Youmans accelerator," which is a static atmosphere particle accelerator employing the deuterium-tritium reaction, and which is described in U.S. Pat. No. 2,689,918, has been found capable of operating in this manner with precision and efficiency.

The radiation detector 26 may be responsive to either thermal neutrons or gamma rays, and it may be a scintillation counter, an ionization chamber, a Geiger-Muller counter, a boron trifluoride counter or any other type of suitable detection apparatus. However, the measurements represented in equation (1) as $N_1$ and $N_2$ are preferably taken during the same equal time intervals following each fast neutron burst from the accelerator, in order that the resulting measurement will be correspondingly accurate. Accordingly, extremely fast and precise gating circuitry such as that depicted in the copending application Ser. No. 361,159, which was filed Apr. 20, 1964, by E. C. Hopkinson and A. B. C. Marshall (now U.S. Pat. No. 3,358,142) may be provided to gate either the detector 26, or its output signal, abruptly on and off with great precision. It is therefore desirable to synchronize the gating of the detector 26 with the pulsation of the neutron source 24.

Accordingly, a gating circuit 29 is preferably included in the housing 22 for pulsing the neutron source 24 at a preselected frequency, and for synchronously actuating the detector 26 for at least two preselected equal detection intervals during the period between each pulse of fast neutrons. For example, and for reasons which will hereinafter be made apparent, a representative gating sequence may provide for 1,000 fast neutron pulses per second with each pulse being about 10 microseconds in duration, and for two detection intervals of 200 microseconds each, with the first detection interval commencing 400 microseconds after each actuation of the source 24, and with the second interval commencing 700 microseconds after such actuation.

As further depicted in FIG. 3, other conventional circuitry may be provided in the instrument housing 22. For example, the output from the detector 26 may be connected to a suitable amplifier and discriminator 30 having its output signal connected, in turn to a pulse shaper and cable driver circuit 32 of conventional design. The output signal from the cable driver circuit 32 is preferably connected to one or more conductors in the logging cable 24 for transmission to the surface of the earth. At the surface, the logging signals may be connected to conventional pulse discrimination circuitry 34 and to one or more count rate meters 36, the output or outputs of which may be applied to a conventional recorder 38 of any suitable design.

As hereinbefore stated, the detector 26 may be made sensitive to either thermal neutrons or gamma rays. Thermal neutron detection has the advantage of providing a measurement which is completely independent of any irrelevant radiation, such as gamma radiation emitted by naturally radioactive shales, and such as gamma rays emitted by substances which have been activated by the fast neutrons from the neutron source 24. However, it must be remembered that the borehole 2 will almost always be filled with either drilling mud or salt water, and many of the thermal neutrons which will enter the borehole 2 from the surrounding earth will be captured by the fluid in the borehole 2 before reaching the detector 26. In addition, many of those neutrons which enter the borehole 2 at epithermal energies are thereafter slowed to thermal energy by the fluid in the borehole 2. Thus, a so-called "thermal neutron measurement" of the formation 12 will unfortunately necessarily omit many neutrons which depart the formation 12 at thermal energy and are then captured by the fluids in the borehole 2, and will also include many neutrons which actually departed the formation 12 while still at epithermal energies.

On the other hand, use of a detector 26 capable of seeing gamma rays will provide several very important advantages. First, gamma rays are far more penetrative than neutrons, and thus the gamma radiation which is produced in the earth formation 12 by capture of thermal neutrons is relatively unaffected by passage through the fluid in the borehole 2. In other words, fluid in the borehole 2 will not slow down or absorb gamma rays to the same extent that it slows and captures neutrons.

Second, detection of gamma rays will achieve deeper investigation into the surrounding earth, since gamma rays are far more penetrative than are thermal neutrons, and since a gamma ray which is created by a capture reaction in the earth will have a much greater chance of penetrating back into the borehole 2 to the detector 26.

Third, and most important, it should be remembered that the hydrogenous character of any of the fluids in the borehole 2 will usually give these fluids a relatively high macroscopic thermal neutron capture cross section in comparison with the macroscopic thermal neutron capture cross section of an oil or salt water saturated earth formation 12. Thus, those thermal neutrons which are in the borehole 2 will be captured much more quickly than will those thermal neutrons which have penetrated into the surrounding earth.

Accordingly, that portion of the thermal neutron population which subsists in the borehole 2 will decline away at a much faster rate than will that portion which subsists in the surrounding earth. Normally, it is the earth formation 12 which is of interest, rather than the fluid in the borehole 2, and thus gamma ray measurements made during the latter portion of the time interval between the fast neutron pulses will be unaffected by the drilling mud or other fluid in the borehole 2. In other words, if the detector 26 is actuated only after all of the neutrons in the borehole 2 have been captured, then $N_1$ and $N_2$ in equation (1) will be limited strictly to gamma rays produced by capture reactions occurring only in the adjacent regions of the surrounding earth.

As hereinbefore stated, the fluid content of the invaded zone 16 of a fluid-bearing formation 12 will include mud filtrate as well as whatever oil and formation water (usually brine) has not been displaced by the invading filtrate. Thus, as shown by equation (6), the macroscopic thermal neutron capture cross section of the fluid mixture will be a function of the sum of the thermal cross sections of each of these three fluids. Although the thermal cross section of oil is a known constant, and although the cross sections for both the formation water and the mud filtrate can be predetermined prior to logging the borehole 2, it would be preferable from the standpoint of commercial well logging practices if no invasion of the formation 2 had occurred. Since that cannot be prevented, however, it will be apparent from the foregoing that it is the fact that the thermal neutron capture cross section of the mud filtrate differs from that of the formation water that is the source of the difficulty. Hence, if the mud filtrate has the same thermal neutron capture cross section as that of the formation water, the formation water and the mud filtrate could be considered to be the same substance inasmuch as it is the oil in the formation 12 which is of interest. Accordingly, if the formation water is sampled prior to logging the borehole 2, the thermal cross section of the formation water can be determined and then the composition of the drilling mud can be altered so that the thermal cross section of the mud filtrate will be the same as that of the formation water in the formation 2. Thus, equation (6) can then be restated as:

$$\Sigma_{formation} = A\Sigma_{matrix} + B\Sigma_{oil} + C\Sigma_{water/filtrate} \quad (8)$$

and equation (7) can then be restated as:

$$\Sigma_{formation} = (1-\Phi)\Sigma_{matrix} + S_o\Phi\Sigma_{oil} + S_{wlf}\Phi\Sigma_{water/filtrate} \quad (9)$$

wherein $S_{wlf}$ is the proportion of either water and/or filtrate in the region being logged.

It should be remembered that the ingredients of commercial drilling muds are selected for many specific purposes, not the least of which is that it is particularly desirable that the drilling mud not radically affect the character of the formation 2 insofar as resistivity and induction logging measurements are concerned. Thus, it is essential that the thermal cross section of the mud filtrate not be altered by the use of any additive which will have any substantial effect on the other characteristics of the formation 2. Accordingly, such additives should be restricted to soluble compounds of boron, lithium, cadmium, gadolinium, and the like, since these elements have an extremely large thermal neutron capture cross section and since only a relatively minute amount can effect a radical change in the macroscopic thermal neutron capture cross section of the mud filtrate. For example, lithium citrate or boric acid, or the like, can be added in amounts which will sharply alter the thermal cross section of the filtrate without producing any visible change in the viscosity, density or other important mechanical or chemical properties or characteristics of the mud.

In this respect, it should be noted that boric acid and the like has a tendency to significantly affect the time required for the cement in the annulus of a cased borehole to "set." Thus, it will be preferable for purposes of the present invention to use only boric acid or lithium citrate enriched, respectively, with boron-10 or lithium-6, since this will enable the cross section of the mud filtrate to be altered with only a small amount of additive.

It will be appreciated that, after a well has been cased and the pressure in the annulus become less than the formation pressure, the mud cake 14 may be dislodged from the face of the formation 12 and the natural fluids in the uninvaded zone 18 may displace the fluids in the invaded zone 16. In such a case, the logging measurements of the macroscopic thermal neutron capture cross section of the earth formations around the borehole 2, will remain the same after the well is cased and the natural formation fluids have reentered the invaded regions of these formations, except when these natural fluids include a substantial proportion of oil. Consequently, the measured cross section will change because the proportion of oil in the formerly invaded region of the fluid-bearing formation will change, and this change can be taken as a strong indication of the presence and amount of whatever recoverable oil may be present in the formation 12 of interest.

As hereinbefore stated, it is usual that the fluid content of the borehole 2 will have a higher macroscopic thermal neutron capture cross section than that of the fluid-bearing formation 12, and this will still be true even if the thermal cross section of the mud filtrate is altered to be the same as that of the formation water in the formation 12. This is due to the fact that the cross section of the matrix of the formation 12 is usually substantially less than that of any fluid which may be contained therein, and thus the relative cross sections of the drilling mud and the formation 12 will differ for this reason alone.

If the formation water is substantially composed of fresh water, and if no soluble boron or gadolinium compounds, or the like, are present in the formation water, then the primary contributor to the capture cross sections of both the formation water and the oil will be the hydrogen nuclei in these fluids. Since oil and water are substantially equally hydrogenous, the capture cross section of the formation water in such a case will be the same or substantially the same as that of the oil in the formation 12.

However, it is a fact that even when the formation water is fresh it almost always contains a substantial quantity of high capture cross section substances which are soluble in water but not in oil. Moreover, the water which is naturally present in most formations of interest to the oil and gas industry is usually brine, and it so happens that a chlorine nucleus has a capture cross section which is more than thirty times as great as that of a hydrogen nucleus. Accordingly, it may be taken as generally the case that the natural water in an earth formation has a capture cross section which is substantially greater than that of any oil which may be present in any earth formation 12.

Thus, it will follow that the fluid contents of the borehole 2, whether they be composed of oil, formation water, or drilling mud (which is at least as hydrogenous as oil), will have a thermal neutron capture cross section greater than that of the formation 12, and it will also follow that if the capture cross section of the mud filtrate is altered to correspond to that of the formation water, the macroscopic thermal neutron capture cross section of the invaded zone 16 will be greater than that of the uninvaded zone 18, if oil is present in the formation 12 and if the invading filtrate has not displaced all of such oil. Accordingly, the first and second detection intervals following each fast neutron pulse can be timed so that the formation 12 can be logged in preference to the contents of the borehole 2; and moreover, in cases where the invaded zone does not extend beyond the radius of investigation of the method, either the invaded zone 16 or the uninvaded zone 18 can be logged independently of the other.

As hereinbefore stated, if the detector 26 is selected to see gamma rays instead of thermal neutrons, and if the first detection interval is delayed until the thermal neutrons in the borehole 2 have substantially all been captured, the detector 26 will see substantially only gamma radiation arising from thermal neutron capture interactions in the surrounding earth. Similarly, if the first detection interval is delayed an appropriate further time interval, the thermal neutrons in the invaded zone 16 will have substantially declined and the detector 26 will see substantially only gamma rays emanating from the uninvaded zone 18. However, it will be apparent that this will depend completely on the invaded zone 16 having the higher macroscopic thermal neutron capture cross section, and thus it is preferable that the mud filtrate be altered or preestablished such that it have a thermal neutron capture cross section at least as great as that of the formation water and appreciably greater than that of the oil in the formation 12.

It will be apparent that the uninvaded zone 18 of the formation 12 can be selectively logged independently of the invaded zone 16 by merely selecting a delay interval such that the thermal neutrons in the borehole 2 and the invaded zone 16 will have substantially declined when the first detection interval is commenced. It will be further apparent that the invaded zone 16 can be selectively and independently logged by utilizing an instrument 22 as depicted in FIG. 3, wherein a second detector 27 is gated to see only gamma rays from the uninvaded zone 18, and wherein the other detector 26 is gated earlier to see gammas from the formation 12 as a whole. In this form of the present invention, the counts obtained from the second detector 27 may be compared with the counts from the first detector 26, or the ratio of the counts from the second detector 27 may be compared with the ratio of the counts from the first detector 26. Alternatively, the first detector 26 may be gated on three or more discrete intervals which are scheduled so that the first two intervals will encompass gamma radiation from both the invaded zone 16 and the uninvaded zone 18, and the next two intervals (or perhaps the second and third interval), will encompass primarily gamma radiation from the uninvaded zone 18 of the formation 12.

It should be noted that the forms of the present invention which are described and depicted herein are especially useful in a cased and cemented borehole, and that it is not essential to the purposes of the invention that the drill pipe and drill bit be removed from the borehole. Accordingly, in one particularly useful form of the invention, the logging tool may be inserted in the drill pipe at intervals during the drilling of the well, whereby interim logging measurements of the oil in formations of special interest may be made, from time-to-time, during the drilling of the well. In such a case, it is especially important that the thermal neutron capture cross section of the mud filtrate correspond to that of the formation water, since it is during drilling operations that the formations tend to be invaded to the greatest extent.

Those having experience in this art will be fully aware that the present invention provides the only means for making an interim measurement of the amount of oil in a subsurface formation, conventional logging techniques such as the well known induction logging method cannot be used inside a steel pipe, and since conventional radioactivity logging measurements such as the natural gamma ray or neutron-gamma log cannot be used to measure the formation fluids in a quantitative manner. On the other hand, it is during the drilling operation that the formations are invaded to the maximum extent, as hereinbefore noted, since the formation tends to "recover"

within a period usually varying from a few hours to a few days following the casing and cementing of the borehole. Thus, it is particularly important for present purposes that such interim measurements as may be taken with the logging tool disposed inside the drill pipe be clearly indicative of that oil which has not been displaced by the invading mud filtrate.

The expression "recovery," as it is used herein, is intended to refer to the tendency of the natural formation fluids to return to and reenter the invaded zone of the formations. The extent to which this occurs is a function of the percentage of "movable" oil in the formation, and it tends to vary to a considerable extent from one formation to another. Furthermore, the relative proportion of "movable" oil to the "immovable" oil in a formation can be measured by means of the present invention as a direct indication of the producibility of that formation.

Accordingly, the thermal neutron capture cross section of the mud filtrate must first be adjusted to correspond to that of the formation water, and then the well may be drilled in a conventional manner. During or subsequent to drilling of the well, but before the well is cased and cemented, the well may be logged to provide a measurement of the "immovable" oil in the invaded region of a formation of interest.

After the well is cased and cemented, the formation may be permitted to "recover" as hereinbefore described. Then, the well may be relogged to obtain a second later measurement of the oil in the invaded zone of the formation. Accordingly, the two measurements may be compared, preferably by subtracting the measurement of the immovable oil from the total oil found in the invaded zone after recovery of the formation to provide a useful measurement of the amount of "movable" oil in the formation.

This measurement of the "movable" oil in a formation of interest is especially significant in providing a basis for evaluating the commercial potential of that formation. It is well known that some formations contain a relatively large amount of oil which, due to factors such as the low permeability of the formations, cannot be recovered in commercial quantities by use of conventional production techniques. By providing a direct quantitative indication of the amount of "movable" oil in a formation, it will be apparent that the present invention is particularly useful in providing a direct indication of the potential profitability of that formation.

Referring now to FIGS. 4—5, there may be seen a functional representation of how the depth of investigation may be selectively adjusted by timing the detection intervals. In particular, there is represented a logging instrument 44 of the type depicted in FIGS. 2—3 which is suspended in a borehole 42 traversing an earth formation having an invaded zone 46 and an uninvaded zone 48. By scheduling the first detection interval to commence after the thermal neutrons in the borehole 42 have substantially all disappeared, but to accept and to see gamma rays entering the borehole 42 thereafter, it will be apparent that the instrument 44 can be made to log only the earth and other substances surrounding the dashed line 50 and to avoid logging the substances within the circle defined by dashed line 50.

The size of the area within the dashed line 50 is determined by the delay interval selected, and thus FIG. 4 illustrates a delay interval chosen so that the dashed line 50 will be approximately the size of the borehole 42. On the other hand, FIG. 5 shows that the delay interval has been lengthened so that the dashed line 50 encompasses the scope of the borehole 42 and the invaded zone 46, but excludes the uninvaded zone 48 in the surrounding earth. Thus, the logging instrument 44 will log only the uninvaded zone 48.

It will be apparent from the foregoing that many other variations and modifications may be made in the structures and methods described herein without substantially departing from the essential concept of the present invention. Accordingly, it should be clearly understood that the forms of the invention described herein and depicted in the accompanying drawings, are exemplary only and are not intended as limitations in the scope of the present invention.

I claim:
1. A method of determining the amount of oil in a predetermined volumetric unit of a subsurface earth formation containing a liquid and traversed by a borehole, said method comprising:
deriving the porosity of said earth formation,
deriving the thermal neutron capture cross sections of oil, of the matrix of said formation and of the water in said formation,
deriving the macroscopic thermal neutron capture cross section of said formation, and
deriving an indication of the volume of oil in said volumetric unit of said formation according to the relationship:

$$S_o = \frac{\Sigma_{formation} - (1-\phi)\Sigma_{matrix} - S_w \phi \Sigma_{water}}{\phi \Sigma_{oil}}$$

wherein $\Sigma_{formation}$ is the macroscopic thermal neutron capture cross section of said formation, $\Sigma_{matrix}$ is the thermal neutron capture cross section of said matrix, $\Sigma_{water}$ is the thermal neutron capture cross section of said water, $\Sigma oil$ is the thermal neutron capture cross section of oil, $\Phi$ is the porosity of said formation, $S_w$ is the fractional portion of the total liquid in said unit of said formation which is water, wherein $S_o$ is the fractional portion of the total liquid in said unit of said formation which is oil, and wherein $S_o$ plus $S_w$ is equal to unity.

2. The method as described in claim 1, wherein the macroscopic thermal neutron capture cross section of said formation is derived by:
irradiating said formation with a burst of fast neutrons,
detecting during at least two discrete time intervals radiations occasioned in said formation by said fast neutrons, and
deriving a function of the ratio of said radiations detected during one of said intervals to the radiations detected during the other of said intervals.

3. The method as described in claim 2, wherein said detected radiations are thermal neutrons.

4. The method as described in claim 2, wherein said detected radiations are gamma rays.

5. A method of investigating the character of a subsurface earth formation traversed by a borehole, said method comprising:
injecting into said earth formation a fluid having a preselected thermal neutron capture cross section,
thereafter irradiating said fluid and said formation with a discrete burst of fast neutrons,
detecting during at least two discrete successive time intervals radiations occasioned in said formation by said fast neutrons, and
deriving a function of the ratio of said radiations detected during one of said intervals to the radiations detected during the other of said intervals.

6. The method described in claim 5, wherein said injected fluid is injected so as to partially displace any natural fluids in said formation from the region of said formation immediately proximate said borehole.

7. The method described in claim 6, wherein said borehole contains a metal pipe, and wherein said steps of irradiating said formation and detecting said radiations are performed at a location within said pipe.

8. The method described in claim 6, wherein said injected fluid contains a material selected from the group consisting of boric acid and lithium citrate.

9. The method described in claim 8, wherein said selected material is enriched by an element selected from the group consisting of boron-10 and lithium-6.

10. A method of making a quantitative determination of the oil in a subsurface earth formation traversed by a borehole and containing oil and formation water, said method comprising the steps of:
injecting a fluid into said formation to displace at least a portion of said oil and formation water from a first zone in said formation surrounding said borehole into a second zone surrounding said first zone,
thereafter irradiating said formation with a discrete burst of fast neutrons, detecting during at least two successive discrete time intervals radiations occasioned in said formation by said neutrons, and counting the radiations detected during each of said intervals, and deriving the macroscopic thermal neutron capture cross section of said formation in said first zone.

11. The method described in claim 10, wherein said injected fluid has a thermal neutron capture cross section substantially equal to the thermal neutron capture cross section of said formation water.

12. The method as described in claim 11, wherein said injected fluid contains a preselected amount of material selected from the group consisting of boric acid and lithium citrate.

13. The method as described in claim 12, wherein said material is enriched by an element selected from the group consisting of boron-10 and lithium-6.

14. The method as described in claim 13, wherein said injected fluid is substantially composed of drilling mud filtrate.

15. A method of making a quantitative determination of the movable oil in a subsurface earth formation, said method comprising the steps of:

injecting into a portion of said formation so as to at least partially displace the natural fluids therein a preselected fluid having a thermal neutron capture cross section substantially the same as that of any formation water in said formation, making a first measurement of the amount of oil remaining in said portion of said formation invaded by said preselected fluid, permitting the natural fluids in said formation to return to said portion invaded by said preselected fluid, making a second measurement of the amount of oil in said portion of said formation after said natural fluids are permitted to return to said portion, and comparing said first and second measurements.

16. The method as described in claim 15, wherein the step of making said first measurement includes the steps of:

deriving the porosity of said earth formation, deriving the thermal neutron capture cross sections of oil, of the matrix of said formation, and of the water in said formation, deriving the macroscopic thermal neutron capture cross section of said section of said formation, and deriving an indication of the volume of oil in a preselected volumetric unit of said section of said formation according to the relationship:

$$S_o = \frac{\Sigma_{formation} - (1-\phi)\Sigma_{matrix} - S_w \phi \Sigma_{water}}{\phi \Sigma_{oil}}$$

wherein $\Sigma_{formation}$ formation is the macroscopic thermal neutron capture cross section of said formation, $\Sigma_{matrix}$ is the thermal neutron capture cross section of said matrix, $\Sigma_{water}$ water is the thermal neutron capture cross section of said formation water and said injected fluid, $\Sigma_{oil}$ oil is the thermal neutron capture cross section of oil, $\Phi$ is the porosity of said formation, $S_w$ is the fractional portion of the total fluid in said section of said formation which is formation water and injected fluid, wherein $S_o$ is the fractional portion of the total fluid in said section of said formation which is oil, and wherein $S_o$ plus $S_w$ is equal to unity.

17. The method described in claim 16, wherein the step of deriving the macroscopic thermal neutron capture cross section of said section of said formation includes the steps of:

irradiating said formation with a burst of fast neutrons, detecting during at least two discrete time intervals occasioned in said formation by said fast neutrons, and deriving a function of the ratio of said radiations detected during one of said intervals to the radiations detected during the other of said intervals.

18. The method described in claim 17, wherein said injected fluid contains a material selected from the group consisting of boric acid and lithium citrate.

19. The method described in claim 18, wherein said selected material is enriched with an element selected from the group consisting of boron-10 and lithium-6.

20. The method described in claim 19, wherein said detected radiations are thermal neutrons.

21. The method described in claim 19, wherein said detected radiations are gamma rays.

22. A method of making a quantitative determination of the movable oil in a subsurface earth formation, said method comprising the steps of:

drilling a borehole into said formation with a drill bit suspended from a string of drill pipe while injecting into the annulus of said borehole and into a portion of said formation drilling mud filtrate having a thermal neutron capture cross section substantially the same as that of any formation water in said formation, thereafter disposing a pulsable source of fast neutrons in said drill pipe adjacent said formation and irradiating said formation with a first pulse of fast neutrons, detecting during at least two discrete time intervals radiations occasioned in said formations by said first pulse of fast neutrons, deriving a function of the ratio of said radiations occasioned by said first pulse of fast neutrons and which are detected during one of said intervals to the radiations detected during the other of said intervals, thereafter removing said drill pipe and inserting a well casing in said borehole, thereafter disposing a pulsable source of fast neutrons in said casing adjacent said formation and irradiating said formation with a second pulse of fast neutrons, detecting during at least two discrete time intervals radiations occasioned in said formations by said second pulse of fast neutrons, deriving a function of the ratio of said radiations occasioned by said second pulse of fast neutrons and which are detected during one of said intervals to the radiations detected during the other of said intervals, and comparing said derivations.

23. The method described in claim 22, wherein said drilling mud filtrate injected into the annulus of said borehole containing said drill pipe at least partially displaces the natural fluids in said portion of said formation, and wherein said displaced fluids are permitted to at least partially displace said mud filtrate from said portion of said formation after said well casing is inserted into said borehole and before said formation is irradiated with said second pulse of fast neutrons.